United States Patent [19]
McCullough et al.

[11] Patent Number: 5,090,664
[45] Date of Patent: Feb. 25, 1992

[54] COMBINATION JACK AND ROLLER FOR PRECISION MOVEMENT OF HEAVY LOADS

[75] Inventors: George S. McCullough, Glenville; George S. Schmidt, Schenectady, both of N.Y.

[73] Assignee: General Electric Company, Schenectady, N.Y.

[21] Appl. No.: 682,948

[22] Filed: Apr. 10, 1991

[51] Int. Cl.$^5$ .............................. B66F 1/02; B66F 3/08
[52] U.S. Cl. ..................... 254/104; 254/98; 254/7 R; 254/7 C; 269/234
[58] Field of Search ............ 254/104, 92, 98, 13, 254/7 R, 7 C, 7 B; 269/217, 234; 384/50

[56] References Cited

U.S. PATENT DOCUMENTS 4,382,580  5/1983  Hellander ............................ 254/104
4,790,515  12/1988  Pocci ................................ 254/104

FOREIGN PATENT DOCUMENTS 319907  10/1929  United Kingdom ................ 254/104

*Primary Examiner*—Bruce M. Kisliuk
*Assistant Examiner*—Eileen Morgan
*Attorney, Agent, or Firm*—Nixon & Vanderhye

[57] ABSTRACT

The tool includes a base having an adjustment wedge, a counter wedge slidable on the inclined surface of the adjustment wedge, a plurality of roller bars in a recess on the upper surface of the counter wedge and a cover member supported by the roller bars. A power screw is used to horizontally displace the adjustment wedge to elevate the counter wedge, cover member and, hence, the load. The plurality of roller bars are confined within a recess to constrain relative movement of the cover member and the counter wedge. To release the cover member for movement, roller bars of reduced diameter at the opposite ends of the wedge are removed to permit the cover member to move relative to the counter wedge. Horizontal adjustment screws cooperate between the cover member and the base to precisely control the movement.

19 Claims, 3 Drawing Sheets

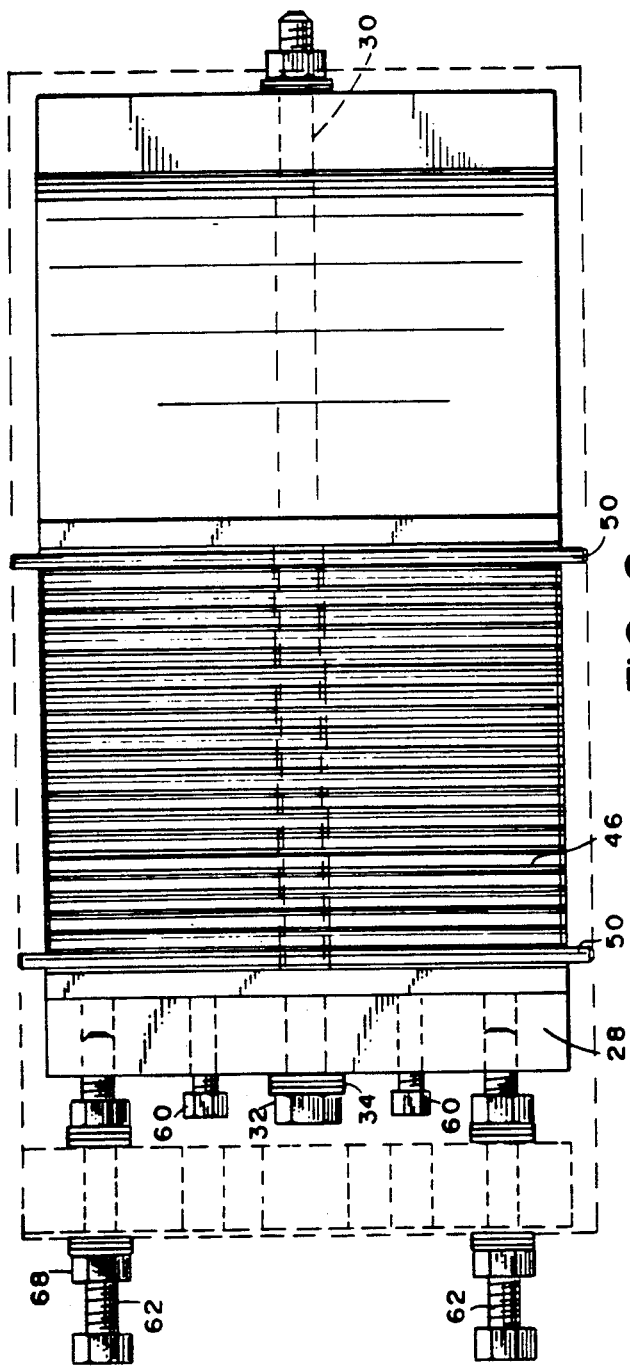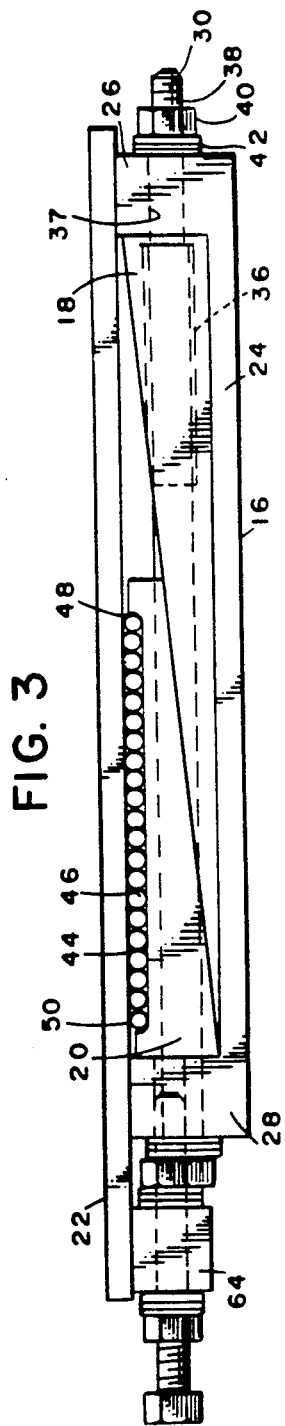

COMBINATION JACK AND ROLLER FOR PRECISION MOVEMENT OF HEAVY LOADS

BACKGROUND AND SUMMARY OF THE INVENTION

The present invention relates to apparatus for precisely moving heavy loads and particularly relates to a combination jack and roller tool for lifting heavy machinery and precisely moving it in a horizontal direction, for example, to align machine components or separate machines.

When moving heavy loads, e.g., when installing and adjusting heavy machines or machine components, it is frequently necessary to very accurately align (within alignment specifications) one machine with another or a machine component with another component or machine. For example, in the installation of turbine-driven power generators, it is necessary to provide accurate coaxial or concentric alignment of the shafts of the turbine and generator, oftentimes within a tolerance of only a few thousandths of an inch. This has been difficult to achieve under ideal conditions and frequently such precision alignment is necessary in environments not conducive to effecting such alignment, for example, when the machines are initially installed in a new power generation plant.

Oftentimes, heavy machines of this type are sited on their foundation elements in rather rough or coarse alignment, for example, by the use of large boom cranes. High cost considerations, in many instances, preclude use of such cranes for final precise adjustment of the machines or their components relative to one another. Frequently, after initial alignment is provided by the lifting crane, final alignments are provided in the vertical direction by hydraulic jacks and calibrated pieces of shim stock which are positioned between the foundation and the load in order to obtain substantial coaxial alignment in the vertical direction within accepted tolerances.

To achieve lateral and angular adjustment of the machines or component parts relative to one another, stops for example, jacking posts, are provided on one side of the machine, and jacks are employed against the opposite side of the base of the machine. The jacks shift the machine or one end of the machine laterally until it butts the jacking posts, thus locating the machine in proper lateral alignment. This method, however, is a rather crude way of obtaining substantially precise lateral alignment. For example, the friction generated by the weight of the machine must be overcome in order to slide the machine horizontally. Additionally, using jacks and jacking posts to laterally move the machine not only results in difficult to control movements but potential deflection of the load itself. That is, the lateral jacking process may introduce torsion and other stresses in the machine, e.g., in the support frame of a generator or turbine. These residual torsional and other stresses later tend to distort and, hence, misalign the machines or their component parts once disposed in final position. Consequently, there has been a need for devices or tools enabling controlled and precise movement of heavy loads, for example, on the order 40,000 pounds or more, in a manner which would permit precise positioning of the load within tolerances, for example, of several thousandths of an inch.

According to the present invention, there is provided apparatus for precision movement of heavy loads wherein the apparatus is low in cost and maintenance, can be readily used by skilled craft labor, and generally permits horizontal movement of the heavy load into a precise position within tolerances of several thousandths of an inch. Particularly, there is provided a combination jack and roller tool including a base and an adjustment wedge slidable along the base. A counter wedge is disposed on top of the adjustment wedge and is movable vertically in response to horizontal movement of the adjustment wedge. The counter wedge supports a cover member which is movable vertically with the counter wedge. A plurality of rollers are disposed between the cover and the counter wedge whereby the cover is also movable horizontally relative to the counter wedge and the base. More specifically, the counter wedge has a recess along its upper surface for receiving a plurality of roller bars which extend transversely to the direction of relative movement of the cover member and the base. The roller bars are free and are carried by the counter wedge for rolling movement in response to relative movement of the cover member and counter wedge. The rollers, however, fill the recess and are therefore restrained from rolling movement by the end edges of the recess. One or more reduced diameter roller bars, forming part of the plurality of roller bars, are configured and oriented for removal from between the cover member and counter wedge when the load is supported on the apparatus, as described hereinafter, thereby to enable relative linear movement between the cover member and counter wedge and rolling movement of the bars.

Coarse adjusting screws cooperate between the base and the counter wedge to move the counter wedge along the adjustment wedge relative to the base to adjust the elevation of the cover member. That is, when the tool is disposed in the gap between the load and its foundation, the coarse adjusting screws are displaced to raise the cover member into engagement with the underside of the load. A power screw is carried for rotation by the base and is threaded to the adjustment wedge. Thus, when the power screw is rotated, its threaded engagement with the adjustment wedge causes the adjustment wedge to slide horizontally and, hence, causes the counter wedge, roller bars and cover member to lift the load. Horizontal adjustment screws cooperate between the cover member and the base to move the cover member and load carried thereby horizontally relative to the base. That is, when the apparatus is supporting the load and the reduced diameter end roller bar or bars are removed, the remaining roller bars roll freely within the confines of the recess in the counter wedge in response to relative movement of the counter wedge and cover member. By thus freeing the cover member for horizontal movement relative to the base, the horizontal adjusting screws are used to incrementally adjust the horizontal location of the load relative to the base and into the desired precise position.

In using the apparatus hereof, and in connection with a preferred embodiment thereof wherein, for example, a generator may be mounted in coaxial alignment (within specifications) with a turbine, the generator is first coarsely aligned with the turbine axis by a crane. Calibrated shims are used to adjust the axis of the generator relative to the turbine axis such that the axes are at like elevation within the prescribed tolerances. To provide for lateral alignment of the generator and turbine axes, the combination jack and roller tool hereof is placed under each of the four corners of the generator. By threading the coarse adjustment screws, the counter wedge slides along the adjustment wedge and elevates the cover member into engagement with the underside of the generator support frame. It will be appreciated that the roller bar axes are aligned generally parallel to the axes of the machines whereby movement of the cover member relative to the base, and hence the generator, is in a direction transverse to the axes to be aligned. The power screw of each combined jack and roller is then rotated such that the generator is supported thereby. The horizontal adjustment screws are then rotated to displace the cover member and, hence, the generator, transversely relative to the base the required incremental distance. It will be appreciated that the combined jack and roller tools at only one end of the generator may be used whereby the generator may be displaced angularly to align the axes. When the generator axis is precisely aligned with the turbine axis within the allowed tolerances, the power screw is rotated in the opposite direction to relieve the loading on the tool. The generator then settles onto the vertical adjustment shims and is fixed in the adjusted position in the conventional manner.

In a preferred embodiment according to the present invention, there is provided apparatus for controlled precision movement of heavy loads comprising a base, an adjustment wedge carried by the base for generally horizontal movement relative thereto and a counter wedge carried by the base in engagement with the adjustment wedge for generally vertical movement in a direction generally normal to such horizontal movement and in response to horizontal movement of the adjustment wedge. Also provided is a member adapted to carry the load and which member is carried by the counter wedge for vertical movement therewith and horizontal movement relative thereto. A first means for moving the adjustment wedge generally horizontally to move the counter wedge and the member generally vertically to lift the load and a second means for moving the member relative to the base for longitudinally moving the load are provided.

In a further preferred embodiment according to the present invention, there is provided apparatus for controlled precision movement of heavy loads comprising a base, an adjustment wedge carried by the base for generally horizontal movement relative thereto and a counter wedge carried by the base in engagement with the adjustment wedge for generally vertical movement in a direction generally normal to the horizontal movement and in response to horizontal movement of the adjustment wedge. Also provided is a cover member adapted to carry the load and which member is carried by the counter wedge for vertical movement therewith and horizontal movement relative thereto. First means are provided for moving the adjustment wedge generally horizontally to move the counter wedge and the member generally vertically to lift the load, and a plurality of roller bars cooperate between the member and the counter wedge enabling relative horizontal movement of the member and the counter wedge. Stops are spaced longitudinally one from the other in a direction transverse to the axes of the roller bars and, in one position thereof, preventing rolling translatory movement of the roller bars in the transverse direction and, in another position, enabling rolling translatory movement of the roller bars in the transverse direction and second means are provided for moving the member relative to the base for longitudinally moving the load.

Accordingly, it is a primary object of the present invention to provide a low-cost, low-maintenance combined jack and roller tool which is readily and easily used by skilled craft labor for effecting precise movement of heavy loads whereby, for example, accurate alignment of the movable load with other equipment and components may be easily achieved.

These and further objects and advantages of the present invention will become more apparent upon reference to the following specification, appended claims and drawings.

BRIEF DESCRIPTION OF THE DRAWING FIGURES

FIG. 2 is a top plan view of a tool constructed in accordance with the present invention, with the cover member of the tool being shown in dashed lines for purposes of illustrating the underlying structure;

FIG. 3 is a side elevational view of the tool illustrated in FIG. 2; and

DETAILED DESCRIPTION OF THE DRAWING FIGURES

Reference will now be made in detail to a present preferred embodiment of the invention, an example of which is illustrated in the accompanying drawings.

Figure 1:
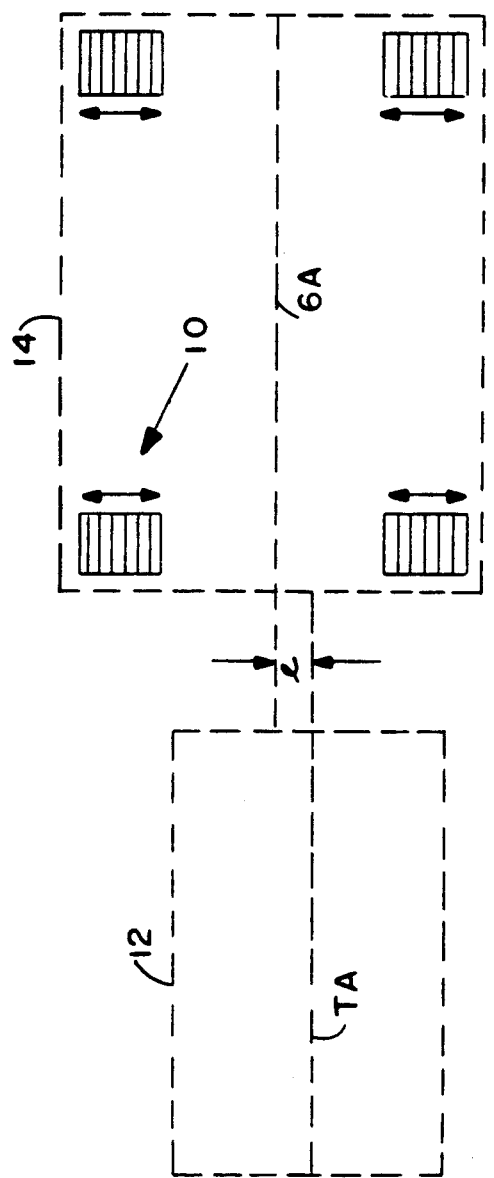
FIG. 1 is a schematic plan view of a pair of machines being aligned by a tool constructed in accordance with the present invention, the misalignment of the axes of the machines being greatly exaggerated for purposes of illustration.

Referring now to FIG. 1, there is schematically illustrated a pair of machines or machine components which are to be placed in alignment, e.g., axial alignment, one with the other by use of tools, generally designated 10, constructed in accordance with the present invention. The machines, for example, may comprise a turbine 12 and a generator 14 which is powered by turbine 12. The axis of the turbine is designated TA and the axis of the generator is designated GA. It will be appreciated that the axes of the turbine and generator are at like elevations and that the axes must be aligned in a horizontal direction. The initial lateral misalignment of the axes is designated at "e" in FIG. 1 (in greatly exaggerated proportion). Consequently, tools 10 are used to shift the load, in this case, generator 14, in a horizontal direction such that the generator axis GA is horizontally aligned with the turbine axis TA and the gap "e" reduced substantially to zero or to within certain tolerances. Generally, therefore, the tools 10 are provided adjacent the four corners of the generator 14. The load of generator 14 is then transferred onto the tools 10, as described in detail hereinafter, and the tools enable the load 14 to be displaced horizontally, in this case, laterally, to align axis GA with axis TA or angularly about one end of the generator to render the axes parallel.

Figure 4:
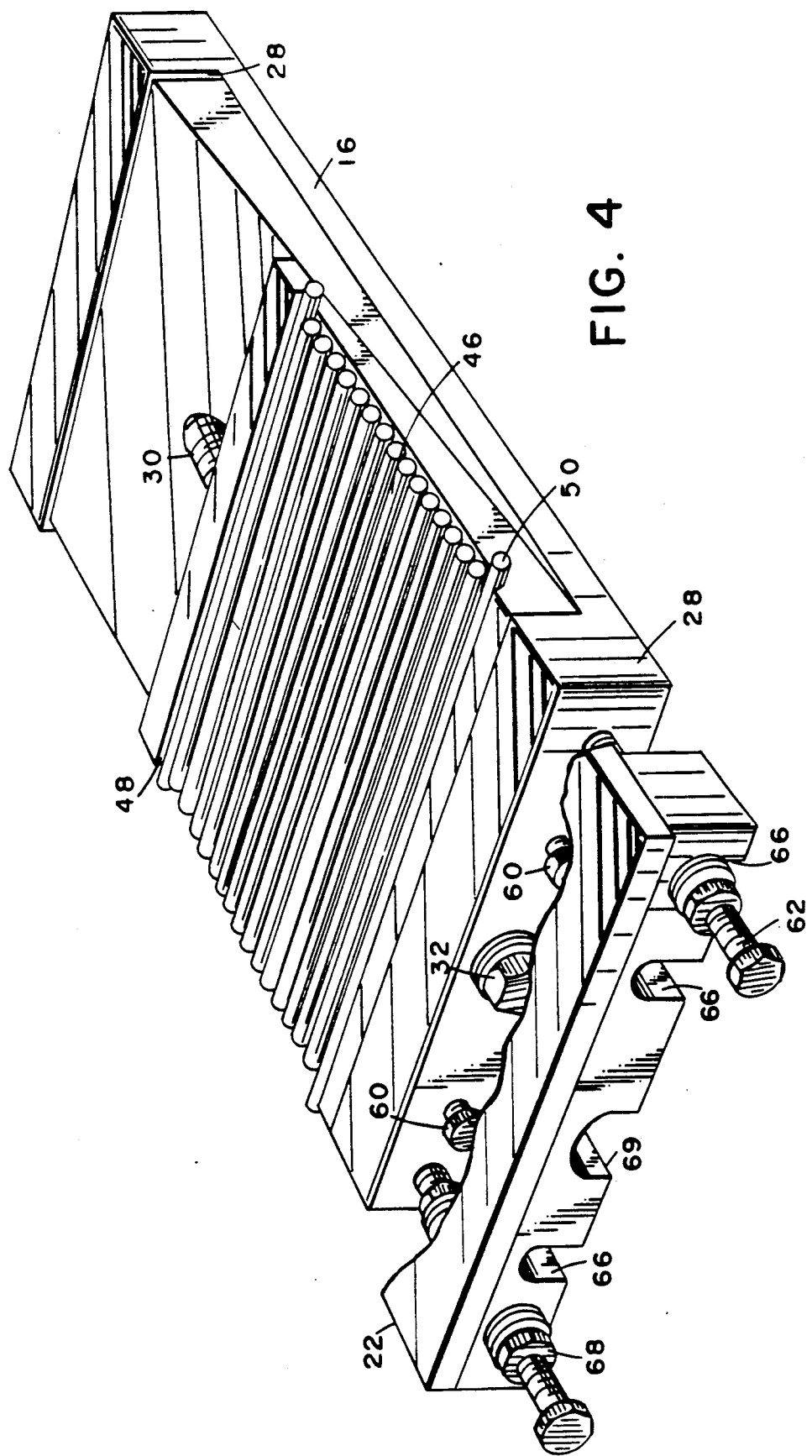
FIG. 4 is a perspective view of the tool hereof with portions of the cover member being broken away to illustrate the underlying structure.

Referring now to FIGS. 2-4, tool 10 comprises a base 16, an adjustment wedge 18, a counter wedge 20 and a cover member 22. Base 16 comprises a generally horizontal base plate 24 having upstanding end flanges 26 and 28, defining a space therebetween for receiving the adjustment wedge 18 and counter wedge 20. Adjustment wedge 18 has a lower horizontal surface for sliding movement along the base 24. Counter wedge 20 is inverted such that the angled surfaces of wedges 18 and 20 engage and are slidable relative to one another. Thus, it will be appreciated that horizontal movement of adjustment wedge 18, for example, from right to left in FIG. 3, causes counter wedge 20 to elevate through the cooperation of the inclined engaging surfaces.

To longitudinally displace the adjustment wedge 18 along base 24 and elevate the load, a power screw 30 extends centrally of base 16 and through central apertures in the upstanding end flanges 26 and 28. Power screw 30 has an integral head 32 at one end in the form of a nut. A plurality of washers 34 engage between head 32 and upstanding flange 28. At the opposite end of power screw 30, a pair of axially spaced threaded portions 36 and 38 are provided, the portion of power screw 30 located within the aperture 37 of upstanding end flange 26 having a smooth-bore. It will therefore be appreciated that by rotating power screw 30, adjustment wedge 18 may be longitudinally displaced along base 16. Threaded portion 36 of power screw 30 passes through a threaded bore in adjustment wedge 18. The threaded end portion 38 receives a nut 40 and washers 42 to retain the power screw on the base. A central channel is provided along the underside of counter wedge 20 for receiving the power screw and spacing it from the counter wedge.

As best illustrated in FIGS. 3 and 4, the upper surface of the counter wedge 20 is recessed at 44 between its opposite side. A plurality of rollers 46, preferably roller bars, are disposed in the recess 44 and extend the full width of the recess 44 between the opposite sides of the tool. Roller bars 46 have a diameter such that surface portions of the bars project above the upper surface of counter wedge 20. Thus, cover member 22 rests on the roller bars 46 and is spaced above counter wedge 20. To prevent the roller bars from forming impressions in cover member 22 under heavy loadings, the cover member 22 is formed of hardened steel. Roller bars 46, however, are constrained from rolling movement because the combined widths or thicknesses of the roller bars extend the full length of recess 44. That is to say, the sum of the diameters of the roller bars is equal to the distance between the upstanding end edges 48 defining recess 44. Because the roller bars are constrained from movement along the recess, the cover member 22 is likewise restrained from movement relative to the counter wedge and base.

To permit movement of the cover member 22 relative to the counter wedge and base, at least one and preferably both of the end roller bars 50 are reduced in diameter in comparison with the diameters of roller bars 46 between end roller bars 50. Consequently, the end roller bars 50 are spaced below the underside of cover member 22. Additionally, the end roller bars 50 are longer than the intermediate roller bars 46 and thus extend laterally beyond the edges of base 16. When it is desirable to move the cover member 22 and hence the load carried thereby relative to the counter wedge 20 and base 16, one or both of the smaller diameter end roller bars 50 may be removed lengthwise from recess 44, their ends projecting beyond the sides of the base facilitating their grasp and removal. In this manner, space is provided in recess 44 into which the intermediate roller bars 44 may roll in response to relative movement between cover member 22 and counter wedge 20. Consequently, a limited range of horizontal movement of cover member 22 relative to counter wedge 20 is permitted and is substantially equal to twice the diameter of each removed end roller bar 50. Other types of stops can be used to prevent initial rolling movement of the bars 46 and enable the bars 46 for rolling movement.

A coarse lift adjustment mechanism is also provided. Particularly, such mechanism enables the tool 10 to be disposed between a foundation and the base support of the load and its cover member 22 to be readily and quickly elevated into engagement with the base support without use of the power screw 30. To accomplish this, a pair of lift screws 60 are threaded into complementary threaded bores of upstanding end flange 28 of base 16. The ends of screws 60 engage the end surface of counter wedge 20. By threading screws 60 inwardly toward counter wedge 20, the latter may be displaced longitudinally along the inclined surface of adjustment wedge 18, thereby quickly elevating counter wedge 20 and cover member 22 carried thereby.

Additionally, a pair of horizontal adjustment screws 62 are provided for controllably displacing cover member 22 and the load carried thereby relative to the counter wedge 20 and base 16. Cover member 22 has a depending flange 64 having a plurality of apertures 66 and 69 which open through the lower face of flange 64. Threaded bolts 62 extend through the outboard pair of apertures 66 for threaded engagement in threaded bores in the upstanding flange 28 of base 16. Lock nuts 68 are provided on the threaded bolts 62 on opposite sides of the depending flange 64. Thus, by freeing the bolts by disengaging the lock nuts, the bolts 62 may be threaded to move cover member 22 horizontally relative to the counter wedge 20 and base 16. It will also be appreciated that the inboard aperture 66 and central aperture 69 in depending flange 64 permit socket wrenches to be applied to screw bolts 60 and the power screw 30, respectively.

To use tools 10, they are disposed between the base support for the load, for example, the base of generator 14, and a foundation at each of the four corners of the load. Note that the direction of relative movement of cover member 22 and base 16 is transverse to the axis GA to be aligned with the axis TA. Once located, coarse lift screws 60 are rotated to longitudinally displace counter wedge 20 along the inclined surface of adjustment wedge 18, thereby elevating cover member 22 into engagement with the underside of the support for the load 14. Once engaged, power screw 30 is rotated by disposing a socket wrench through aperture 69 to engage nut 32. By rotating power screw 30, adjustment wedge 18 is longitudinally displaced along base 16 in a direction to lift counter wedge 20, cover member 22 and, hence, the load carried by cover member 22. Relative displacement of cover member 22 and counter wedge 20 is prevented or constrained because the roller bars 46 fill the entire length of recess 44. Once the load is supported by the four tools adjacent its four corners, the reduced diameter end roller bars 50 are removed, thus affording space in recess 44 into which roller bars 46 may roll. To move the load in the horizontal direction to bring axis GA into alignment with axis TA, the locking nuts 68 of the horizontal adjustment screws 62 are backed off and the adjustment screws rotated to displace cover member 22 and, hence, the load carried thereby relative to the counter wedge 20 and base 16.

Once the alignment of the axes is accomplished within the desired tolerances, the load 14 is fixed in position by conventional methods. Accordingly, the load is transferred to its permanent foundation by reversely rotating power screw 30, enabling counter wedge 20 and hence cover member 22 to be lowered from the support base for the load. Once cover member 22 is spaced from the load support base, the tool may be removed.

The load 14 may also be displaced angularly. For example, where the axes TA and GA are skewed relative to one another and form an angle therebetween in a horizontal plane, the tools 10 at one or the other of the ends of the load may be operated to pivot the load about the opposite end of the load, thus closing the angle between the axes. A combination of lateral translational and angular movements may be effected if necessary to correct for both lateral and angular misalignment.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. Apparatus for controlled precision movement of heavy loads comprising:
   a base;
   an adjustment wedge carried by said base for generally horizontal movement relative thereto;
   a counter wedge carried by said base in engagement with said adjustment wedge for generally vertical movement in a direction generally normal to said horizontal movement and in response to horizontal movement of said adjustment wedge;
   a member adapted to carry the load and carried by said counter wedge for vertical movement therewith and horizontal movement relative thereto;
   first means for moving said adjustment wedge generally horizontally to move said counter wedge and said member generally vertically to lift the load; and
   second means for moving said member relative to said base for longitudinally moving the load.

2. Apparatus according to claim 1 wherein said second means is cooperable between said base and said member to move said member and the load carried thereby.

3. Apparatus according to claim 1 including rollers cooperable between said member and said counter wedge enabling relative horizontal movement of said member and said counter wedge.

4. Apparatus according to claim 3 wherein said rollers include a plurality of elongated roller bars disposed between said counter wedge and said member.

5. Apparatus according to claim 4 wherein said roller bars are carried between said counter wedge and said member for rolling translatory movement in response to relative movement of said counter wedge and said member.

6. Apparatus according to claim 5 including means for restraining the rolling translatory movement of said roller bars between said counter wedge and said member and means for releasing said roller bars for rolling translatory movement between said counter wedge and said member to enable movement of said member and the load carried thereby relative to said base.

7. Apparatus according to claim 6 including a recess carried by said counter wedge for receiving said roller bars with the edges defining said recess restraining the rolling translatory movement of said plurality of roller bars and thereby relative horizontal movement of said member with the load carried thereby and said counter wedge, and means for releasing said roller bars for rolling translatory horizontal movement between said member and said counter wedge to enable said member and the load carried thereby to move horizontally relative to said base.

8. Apparatus according to claim 7 wherein said release means includes at least one roller bar of said plurality thereof having a diameter smaller than the diameter of the remaining roller bars enabling removal thereof from said recess and between said counter wedge and said member to permit rolling translatory movement of the remaining roller bars in said recess.

9. Apparatus according to claim 8 wherein said one roller bar is longer than the remaining roller bars to locate at least one end thereof externally accessible of said apparatus whereby said one roller bar can be withdrawn from between said counter wedge and said member.

10. Apparatus according to claim 1 including a third means independent of said first means and cooperable between said base and said counter wedge to horizontally move said counter wedge along said adjustment wedge and thereby enable vertical movement of said adjustment wedge and said member and locate said member in an adjusted vertical position for initial contact with the load.

11. Apparatus according to claim 1 wherein said first means includes a screw cooperable between said base and said adjustment wedge for horizontally moving said adjustment wedge in response to rotation of said screw.

12. Apparatus for controlled precision movement of heavy loads comprising:
    a base;
    an adjustment wedge carried by said base for generally horizontal movement relative thereto;
    a counter wedge carried by said base in engagement with said adjustment wedge for generally vertical movement in a direction generally normal to said horizontal movement and in response to horizontal movement of said adjustment wedge;
    a cover member adapted to carry the load and carried by said counter wedge for vertical movement therewith and horizontal movement relative thereto;
    first means for moving said adjustment wedge generally horizontally to move said counter wedge and said member generally vertically to lift the load;
    a plurality of roller bars cooperable between said member and said counter wedge enabling relative horizontal movement of said member and said counter wedge, stops spaced longitudinally one from the other in a direction transverse to the axes of the roller bars and, in one position thereof, preventing rolling translatory movement of said roller bars in said transverse direction and, in another position, enabling rolling translatory movement of said roller bars in said transverse direction; and
    second means for moving said member relative to said base for longitudinally moving the load.

13. Apparatus according to claim 12 wherein said second means is cooperable between said base and said member to move said member and the load carried thereby.

14. Apparatus according to claim 12 including a recess carried by said counter wedge for receiving said roller bars with the edges defining said recess restraining the rolling translatory movement of said plurality of roller bars and thereby relative horizontal movement of said cover member with the load carried thereby and said counter wedge, said stops including a pair of said roller bars adjacent the edges of said recess and removable from said recess to enable rolling translatory movement of the remaining roller bars.

15. Apparatus according to claim 14 wherein said pair of roller bars have diameters smaller than the diameter of the remaining roller bars enabling removal thereof from said recess and between said counter wedge and said member to permit rolling translatory movement of the remaining roller bars in said recess.

16. Apparatus according to claim 15 wherein said pair of roller bars are longer than the remaining roller bars to locate at least one end thereof externally accessible of said apparatus whereby said pair of roller bars can be withdrawn from between said counter wedge and said member.

17. Apparatus according to claim 12 including a third means independent of said first means and cooperable between said base and said counter wedge to horizontally move said counter wedge along said adjustment wedge and thereby enable vertical movement of said adjustment wedge and said member and locate said member in an adjusted vertical position for initial contact with the load.

18. Apparatus according to claim 12 wherein said first means includes a screw cooperable between said base and said adjustment wedge for horizontally moving said adjustment wedge in response to rotation of said screw.

19. Apparatus according to claim 16 wherein said base includes an upstanding flange and said cover member includes a depending flange, said second means including a screw cooperable between said flanges to move said member and the load carried thereby, said first means including a screw cooperable between said base and said adjustment wedge for horizontally moving said adjustment wedge in response to rotation of said screw, and a third means independent of said first means and cooperable between said base and said counter wedge to horizontally move said counter wedge along said adjustment wedge and thereby enable vertical movement of said adjustment wedge and said member and locate said member in an adjusted vertical position for initial contact with the load.

* * * * *